United States Patent
Kamrani et al.

(10) Patent No.: US 8,401,698 B2
(45) Date of Patent: Mar. 19, 2013

(54) METHOD FOR OPTIMISING THE PERFORMANCE OF A ROBOT

(75) Inventors: Behnam Kamrani, Göteborg (SE); Viktor Berbyuk, Göteborg (SE); Xiaolong Feng, Västerås (SE); Daniel Wäppling, Västerås (SE)

(73) Assignee: ABB Research Ltd, Zürich (CH)

( * ) Notice: Subject to any disclaimer, the term of this patent is extended or adjusted under 35 U.S.C. 154(b) by 1212 days.

(21) Appl. No.: 10/580,239

(22) PCT Filed: Nov. 23, 2004

(86) PCT No.: PCT/SE2004/001722
§ 371 (c)(1), (2), (4) Date: May 22, 2006

(87) PCT Pub. No.: WO2005/049284
PCT Pub. Date: Jun. 2, 2005

(65) Prior Publication Data
US 2007/0106421 A1    May 10, 2007

Related U.S. Application Data

(60) Provisional application No. 60/523,941, filed on Nov. 24, 2003.

(30) Foreign Application Priority Data

Nov. 23, 2003  (SE) .................................. 0303145-7

(51) Int. Cl.
*G06F 19/00* (2006.01)

(52) U.S. Cl. ........ 700/245; 700/248; 700/173; 700/193; 700/214

(58) Field of Classification Search .............. 700/28–35, 700/40–66, 83, 89, 95, 112, 114, 125, 173, 700/174, 178, 180, 187, 188, 191, 192, 194, 700/245–264, 302, 303, 306; 901/1–50
See application file for complete search history.

(56) References Cited

U.S. PATENT DOCUMENTS

| | | | |
|---|---|---|---|
| 5,341,458 A | | 8/1994 | Kaneko et al. |
| 5,430,643 A | * | 7/1995 | Seraji ............................ 700/263 |
| 6,216,058 B1 | * | 4/2001 | Hosek et al. .................. 700/245 |
| 6,526,373 B1 | * | 2/2003 | Barral .............................. 703/6 |
| 6,643,563 B2 | * | 11/2003 | Hosek et al. .................. 700/245 |

FOREIGN PATENT DOCUMENTS

EP    1 107 082 A2    6/2001

OTHER PUBLICATIONS

J. Alfonso Pamanes G. et al.; Optimal Placement of Robotic Manipulators Using Multiple Kinematic Criteria; 1991 IEEE; pp. 933-938.

(Continued)

*Primary Examiner* — Khoi Tran
*Assistant Examiner* — Bhavesh V Amin
(74) *Attorney, Agent, or Firm* — Seppo Laine Oy; Joshua P. Wert

(57) ABSTRACT

A method for optimizing performance of a robot. At least one experiment is designed including at least two tests. Each test differs from at least one other test in the experiment regarding the location of the task in relation to the robot. The boundaries that are allowable for location of a task are calculated/determined. The effect on optimality for at least one test in the experiment is calculated/determined. The experimental data is fit to an algorithm. The optimal location of the task is calculated/determined.

19 Claims, 13 Drawing Sheets

OTHER PUBLICATIONS

B. Benhabib et al.; Robot Performance Optimization Under Specified Dynamic Conditions; Mech. Mach. Theory, vol. 26, No. 3, 1991; pp. 323-335.

Brad Nelson and Max Donath; Optimizing the Location of Assembly Tasks in a Manipulator's Workplace; Journal of Robotic Systems; (1990); pp. 791-811.

PCT/ISA/237—Written Opinion of the International Searching Authority.

Tim C. Lueth; Automated Planning of Robot Workcell Layouts; IEEE; 1992; pp. 1103-1108.

Chihiro Sawada; Evaluating the Performance of Robotic Compliant Tasks According to Power Consumption; Approach and Applications; IEEE; 1995; pp. 1146-1153.

* cited by examiner

| Test | X | Y | Z |
|------|----|----|----|
| 1 | -1 | -1 | -1 |
| 2 | -1 | -1 | 0 |
| 3 | -1 | -1 | 1 |
| 4 | -1 | 0 | -1 |
| 5 | -1 | 0 | 0 |
| 6 | -1 | 0 | 1 |
| 7 | -1 | 1 | -1 |
| 8 | -1 | 1 | 0 |
| 9 | -1 | 1 | 1 |
| 10 | 0 | -1 | -1 |
| 11 | 0 | -1 | 0 |
| 12 | 0 | -1 | 1 |
| 13 | 0 | 0 | -1 |
| 14 | 0 | 0 | 0 |
| 15 | 0 | 0 | 1 |
| 16 | 0 | 1 | -1 |
| 17 | 0 | 1 | 0 |
| 18 | 0 | 1 | 1 |
| 19 | 1 | -1 | -1 |
| 20 | 1 | -1 | 0 |
| 21 | 1 | -1 | 1 |
| 22 | 1 | 0 | -1 |
| 23 | 1 | 0 | 0 |
| 24 | 1 | 0 | 1 |
| 25 | 1 | 1 | -1 |
| 26 | 1 | 1 | 0 |
| 27 | 1 | 1 | 1 |

Figure 5

METHOD FOR OPTIMISING THE PERFORMANCE OF A ROBOT

CROSS-REFERENCE TO RELATED APPLICATIONS

This application claims priority to Swedish patent application 0303145-7 filed 23 Nov. 2003 and U.S. provisional patent application 60/523,941 filed 24 Nov. 2003 and is the national phase under 35 U.S.C. §371 of PCT/SE2004/001722.

TECHNICAL FIELD OF THE INVENTION

This invention relates to the technology of robot manipulators and automated production applications.

The invention further relates to reducing the cycle time for the robot manipulator when performing a specific task.

More specifically, the invention relates to a method for optimising the location/placement, i.e. position and orientation, of a task relative to a robot manipulator within the robot manipulators workspace.

Furthermore, the invention also relates to optimising robot programs and task execution.

BACKGROUND OF THE INVENTION

In the following the word robot will be used instead of robot manipulator. Typically the robot is an industrial robot for automated production applications.

Typical industrial task applications where robots are used are welding, cutting, painting, gluing, material handling, and material removing, etc. A robot performs a repetitive sequence of movement along a predefined path. Considering the high number of task runs within a specific time span, for instance one year, it is very important to reduce the cycle time. Providing the minimum cycle time for a specific robot task is therefore an essential step in robot applications on the factory floor. Reduction of the cycle time a few percent will increase the productivity in a production line considerably.

It is of general interest to let a robot perform the path motion as fast as possible. Minimizing motion time can significantly shorten cycle times and improve machine utilization, and thus make optimization affordable in applications for which throughput and cost effectiveness is of major concern.

Reduction of motion time can be achieved through optimization in different robotics areas such as general robot design methodology, kinematics, dynamics, structure or arm shape, robot controller, time optimal controls, task-based design, and robot cell design or robot optimal placement. For a given robot, cycle time depends on many parameters, such as the position of the robot relative to the task, the sequence in which the points are visited, the maximum velocities and accelerations of the actuators, the relative position of the points, or the configuration of the arm along the track.

The performance of a robot during the achievement/execution of a task depends on the relative position of the robot and the task. Thus, a robot ill placed at its workstation, takes the risk of an inefficient operation, even as to fall in singularities.

A robot cell is an essential element for automated production and may consist of one or several industrial robots, one or a number of work objects on which the robot would perform tasks, and other cell equipments. For a robot cell containing multiple robots, robots can work either independently or collectively. By robots working collectively it is meant, for example, that one a robot holds a work object while another robot perform tasks on the work object.

A coordinate system, normally referred to as the "world coordinate system", is used to define and manage relative locations of robots, work objects, and other cell equipments in a robot cell. In practice, coordinate systems fixed on robots, normally referred to as "robot coordinate systems", are defined to specify locations of robots in the world coordinate system. Coordinate systems fixed on work objects, normally referred to as "object coordinate systems", are defined to specify locations of work objects in either a user coordinate system, or a robot coordinate system or in the world coordinate system. Examples of different coordinate systems used to define a robot cell are shown in FIGS. 1 and 2.

Prior Art

There is a lot of work reported in the literature on the subject of optimization of robot cell design for maximising the performance for a specific task. Examples discussed are:
  Placement of a robot relative to a work-object
  In what order different tasks should be executed
  Placement of one robot relative to another robot
  Placement of external axes relative to a robot and to each other
  Design of robot tools
  Optimal work object positioning and task sequencing for multi-robot systems
  etc One approach in the literature is to optimise the cell design using the robot kinematics. Nelson and Donath, see "Optimising the location of assembly tasks in a manipulators workspace", Journal of Robotic Systems, Vol. 7, No 6, 1990, propose a method for determining how to place a task in a robots workspace such that the robots manipulability is maximized. Their method automatically locates an assembly task away from singularities within a robots workspace.

Also Pamanes and Zeghloul, "Optimal placement of robot manipulators using multiple kinematic criteria", in Proceedings of the 1991 IEEE International Conference on Robotics and Automation, Sacramento, Calif., April 1991, use kinematic criteria to optimise the location of a task in the robots workspace.

An approach based on kinematic criteria has the disadvantage that the dynamics of the robot is not taken into account. The inertia of the manipulator, gravity effects, and velocity dependent terms depend on the position of the robot. Hence, the performance, e.g. acceleration, is different in different positions in the workspace.

In Benhabib, Tabarah, and Fenton, "Robot performance optimisation under specified dynamic conditions", Mech. Mach. Theory, Vol. 26, No. 3, 1991, several different performances optimization case studies are presented for industrial robots operating under "point-to-point" and "continuous path motion" modes. Optimal location of the robot for maximum force/moment at end-effector and for minimum cycle-time is studied.

Conventional optimization methods are often cumbersome since they demand extensive calculations, high knowledge, and a lot of time. In contrast, for the response surface method the number of simulations is limited, convergence is not an issue, and it is easy to use. Response surface method (see also Box, Hunter and Hunter, 1978, Khuri and Cornell, 1987, Myers and Montgomery, 1995 and Montgomery 1976) is a collection of mathematical and statistical techniques that are useful for the modeling and analysis of problems in which a response of interest is influenced by several variables and the objective is to optimise this response. In the current robot problem, the decision variables can for example consist of x, y, and z coordinates of a reference point of a prescribed path relative to a given robot base and the response of interest to be minimized is the task cycle time. The form of the relationship between the response (cycle time) and the independent variables (x, y, and z coordinates) is unknown. Thus, the first step is to find a suitable approximation for the true functional relationship between the cycle time and the x, y, z coordinates.

Generally, a linear or quadratic approximation function provides proper result in most of RSM problems. Quadratic form consists of interaction and pure quadratic terms. A function including both types of terms is called a "full quadratic function" which has the following form:

$$f(x, y, z) = \begin{matrix} b_0 + b_1 x + b_2 y + b_3 z + & \text{(linear terms)} \\ b_4 xy + b_5 yz + b_6 xz + & \text{(interaction terms)} \\ b_7 x^2 + b_8 y^2 + b_9 z^2 & \text{(quadratic terms)} \end{matrix} \quad (0.1)$$

The model parameters of $\{b_0, b_1, b_2, \ldots, b_9\}$ in Eq. (0.1) can be estimated by making a reasonable amount of experiments in different directions. Designs for fitting response surfaces are called response surface design. For a three-variable problem, at least $2^3+1=9$ experiments are needed to fit a quadratic model.

The more numbers of experiments, the more accurate the response function can be estimated. However, making experiments is very time-consuming and therefore high number of experiments will increase the CPU time needed of the program.

One problem is to find the task operability boundaries in x, y, and z directions around the original location of the task. This is accomplished by defining a test cube whose size controls the amplitude of the change in the x, y, and z coordinates and whose test point coordinates defined in a reference frame at the original task location controls the task shifting directions (see FIG. 4). The test point coordinates must take either of the three values of −1, 0, and 1. For instance, the task location test in direction of (1, 1, 1) will give the operability boundary in positive x, y, and z directions of a shift of $\sqrt{3}/2$*cubesize and experiment in direction of (−1, −1, 0) will find the operability boundary in negative x and y direction in fixed z level of a shift of $\sqrt{2}/2$*cubesize.

A so-called "full factorial design" of experiment in shifting investigation includes 27 tests. FIG. 5 represents the directions that are used for finding the boundary and FIG. 4 graphically depicts these location test shifting vectors (a shifting vector is defined as a vector pointing from the original task location to a location test point). Original location of the task is shown with a big black circle or dot in the middle of the cube, while small circles or dots represent the selective directions for finding the boundary.

However, less number of experiments would be acceptable if decreasing CPU time was vitally important. For instance, Box-Behnken design consisting of 12 tests can be considered but 6 tests, that are only in one direction, i.e., (1, 0, 0), (−1, 0, 0), (0, 1, 0), (0, −1, 0), (0, 0, 1), and (0, 0, −1), are normally of less useful and can be neglected.

Most Important Problems to be Solved

A general and important problem is to identify/determine the optimal relative location of a robot and a specific task so that the robot performance is optimised for that task. Current robot programming systems today lack the capability to effectively and automatically determine the optimum locations of the robot and its task for performing efficient operations within the robots workspace.

A robot is a complex system to model in an accurate and efficient way and the large number of simulations needed today for optimizing the performance of a robot takes too long simulation and CPU time. This has to be reduced.

The models used to simulate robots are also highly non-linear and the problem of optimizing the performance of a robot is very complex. It is therefore very hard to find optimising methods that always present an acceptable solution.

Since the optimization problem is so complicated and complex, it require knowledge in optimization theory by the user. The user e.g. needs to normalize variables, choose weighting factors and tolerances etc, and this is of course a problem with known methods.

The Object of the Present Invention

The object of this invention is to solve above indicated problems and present a method for efficiently finding an optimal location, at least a position and an orientation, of a robot relative to a specific task.

Another object of the present invention is to find a location that requires a minimum cycle time for the robot performing the specific task.

Yet another object of the present invention is to determine the optimal path of the robot performing the specific task.

A still further object of the present invention is to maximize the robots component lifetime or find the most balanced "component lifetime".

Another object of the present invention is to minimize power consumption of the robot system and/or optimise thermal management of the robot system.

Yet another objective is to optimise the quality of a robot based process.

SUMMARY OF THE INVENTION

The objects of the present invention are achieved by a method for optimising the location, i.e. position and/or orientation, of a task relative to a robot.

The method comprises the steps of designing at least one experiment consisting of at least two tests, each test differing from at least one other test in the experiment regarding the location of the task in relation to the robot, calculating/determining the boundaries that are allowable for location of a task, calculating/determining the effect on optimality for at least one test in the experiment, fitting the experimental data to an algorithm, and calculating/determining the optimal location, i.e. the position and the orientation, of the task.

Advantages with the Present Invention

The method according to the present invention reduces simulation time as the number of simulations is known in advance and minimized by selecting an appropriate experiment.

The method is also robust and identifies a simple function that approximates the behaviour of the robot. The method always will find the optimum point of the simple function it always find a solution to the optimising problem and reduces the cycle time significantly.

The method also is easy to use and the robot can be programmed as usual (on-line or off-line). The input to the optimization procedure is the robot program and the robot type. There is no need for the user to have knowledge about optimization theory since there is no need to normalize variables, choose weighting factors and tolerances.

The method also is easy to implement and the cost for it will only be the simulation time and the software.

BRIEF DESCRIPTION OF DRAWINGS

For better understanding of the present invention, reference now will be made to the below drawings/figures.

FIG. 5 is a table showing a "full factorial experiment design" including three variables.

DESCRIPTION OF PREFERRED EMBODIMENTS OF THE INVENTION

A typical robot may consists of a main arm system and associated joints (normally of revolute type or other types), a wrist of normally two or three rotational degrees of freedom relative to main arm system with a platform for tool attachment, and a drive-train system of gearboxes and motors for actuating the motion of robot main arm system and the wrist. The robot is provided with a control system that controls the position and orientation of a tool that is attached on the platform of the wrist. One critical reference point with both position and orientation associated with the tool is normally referred to as "tool centre point", TCP.

A set of robot parameters associated with arm lengths, offsets between adjacent arms, and allowed arm rotational angles are normally referred to as robot kinematic parameters. It is this set of robot parameters that decides the workspace of a robot, or the volume/space in which the robot can perform any tasks.

Figure 9:
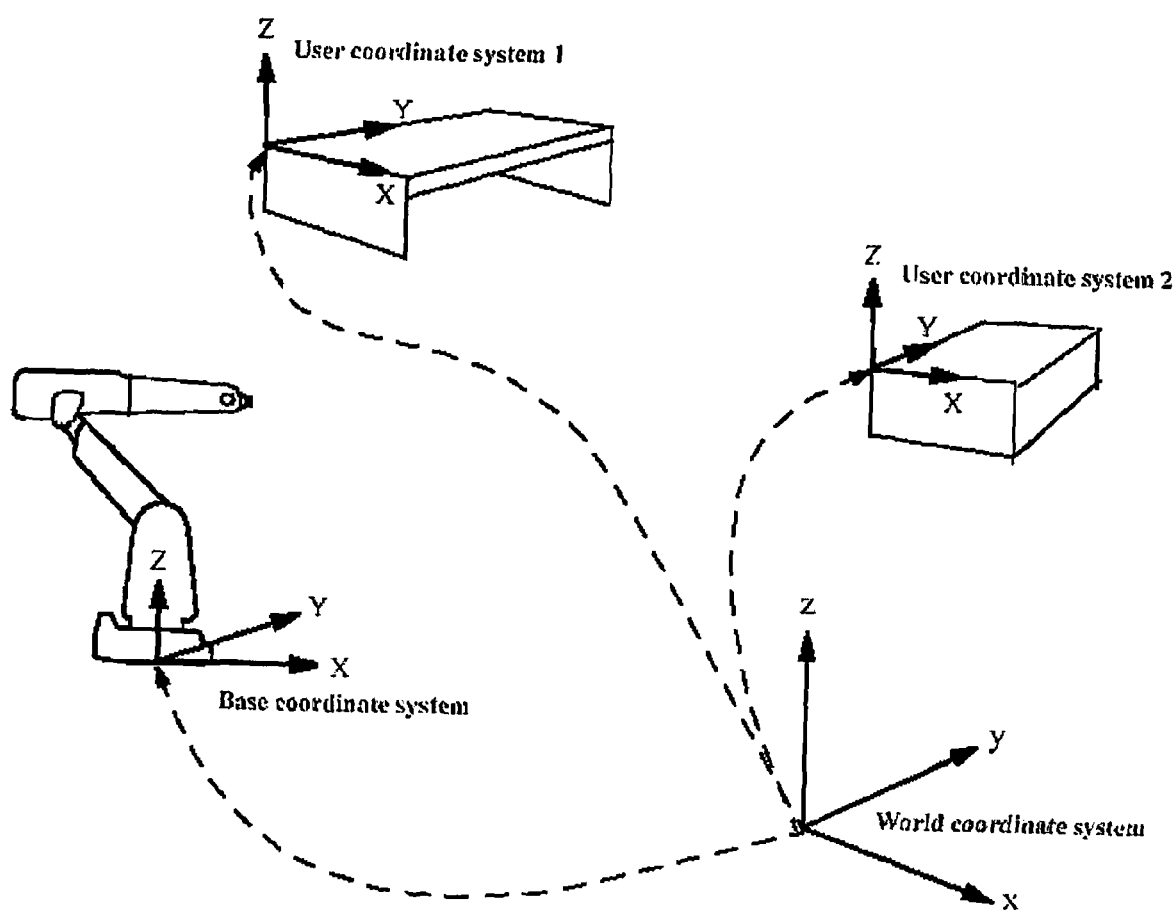
FIG. 9 illustrates different coordinate systems in which targets can be located/defined.
Figure 10:
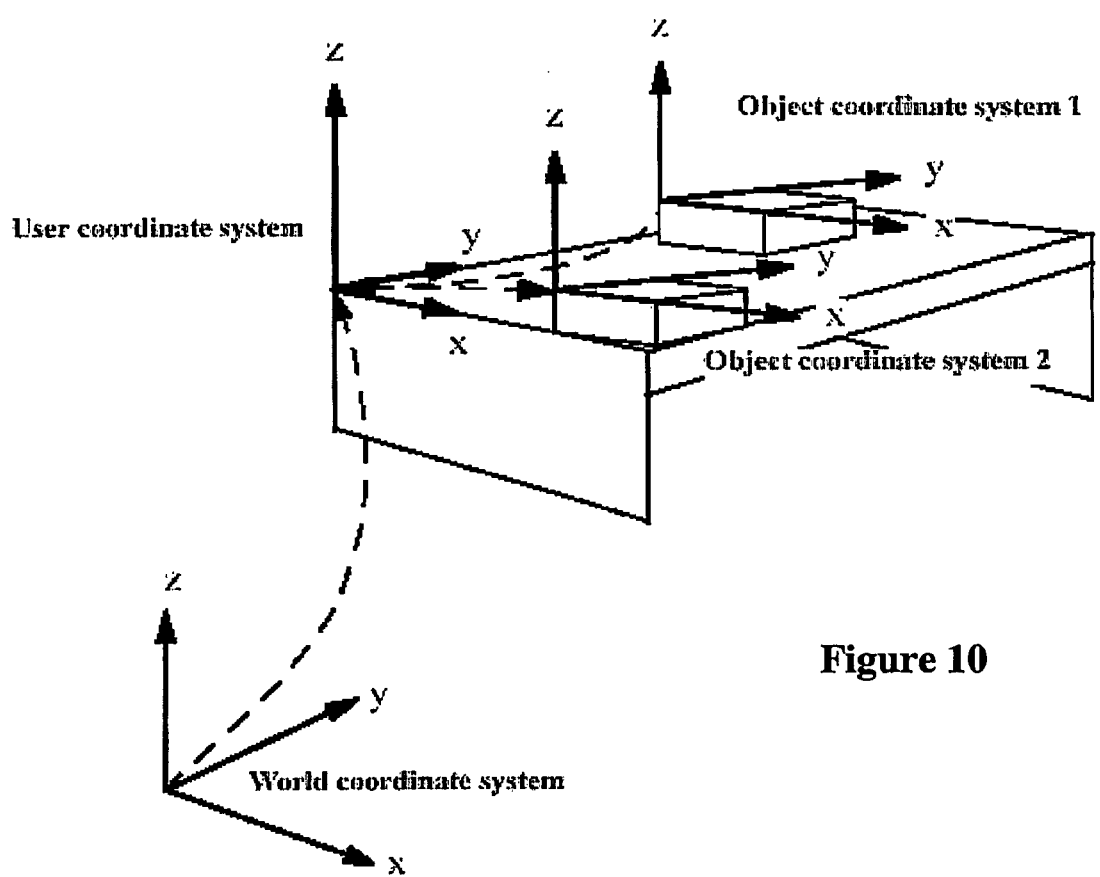
FIG. 10 illustrates how an object coordinate system may be defined with respect to other coordinate systems.
Figure 11:
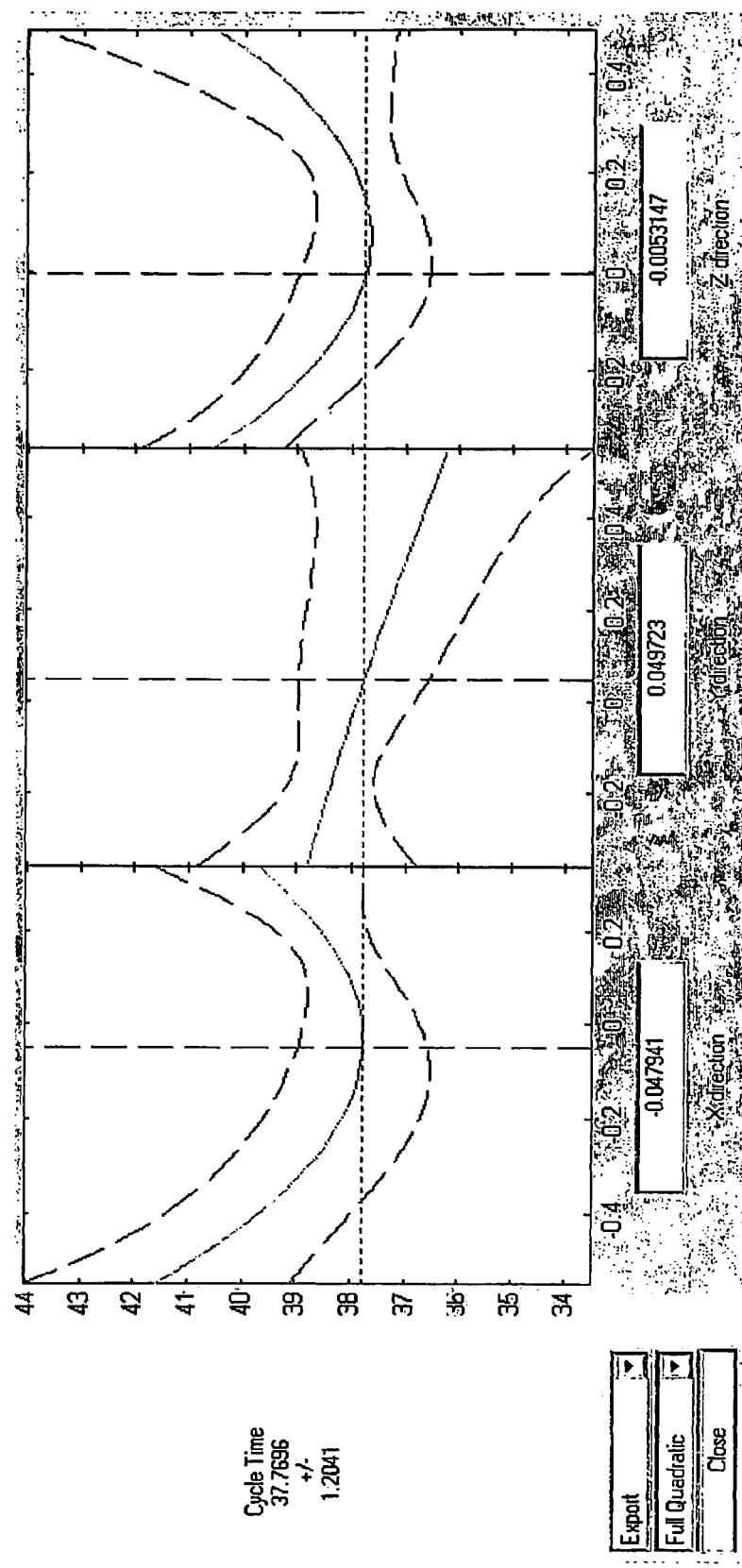
FIG. 11 is an interactive plot of response cycle time as a function of x,y,z coordinates and show what model type provide the best result.
Figure 12:
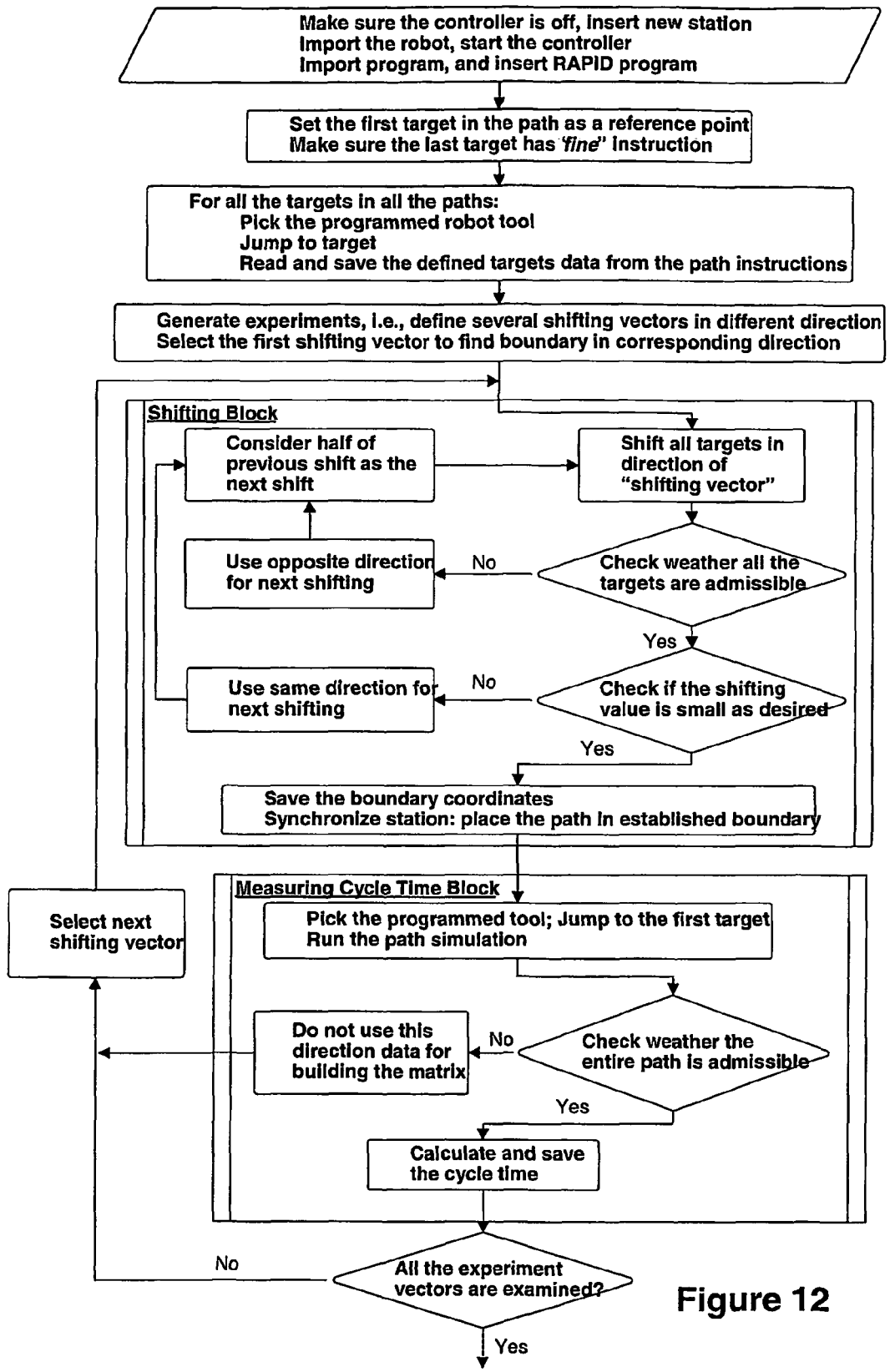
FIG. 12-14 is detailed flowcharts of a possible algorithm of the method according to the invention.
Figure 13:
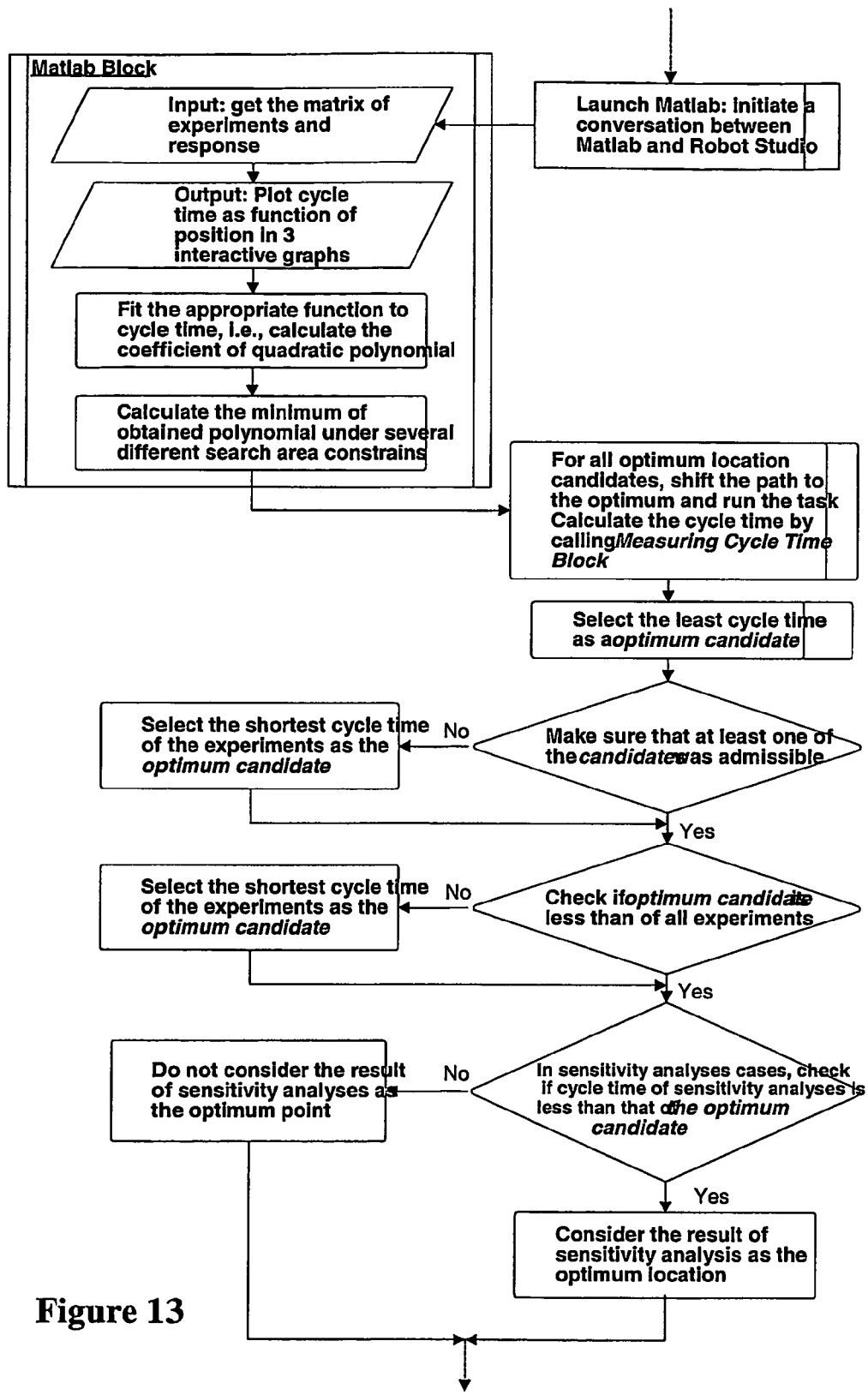
Figure 14:
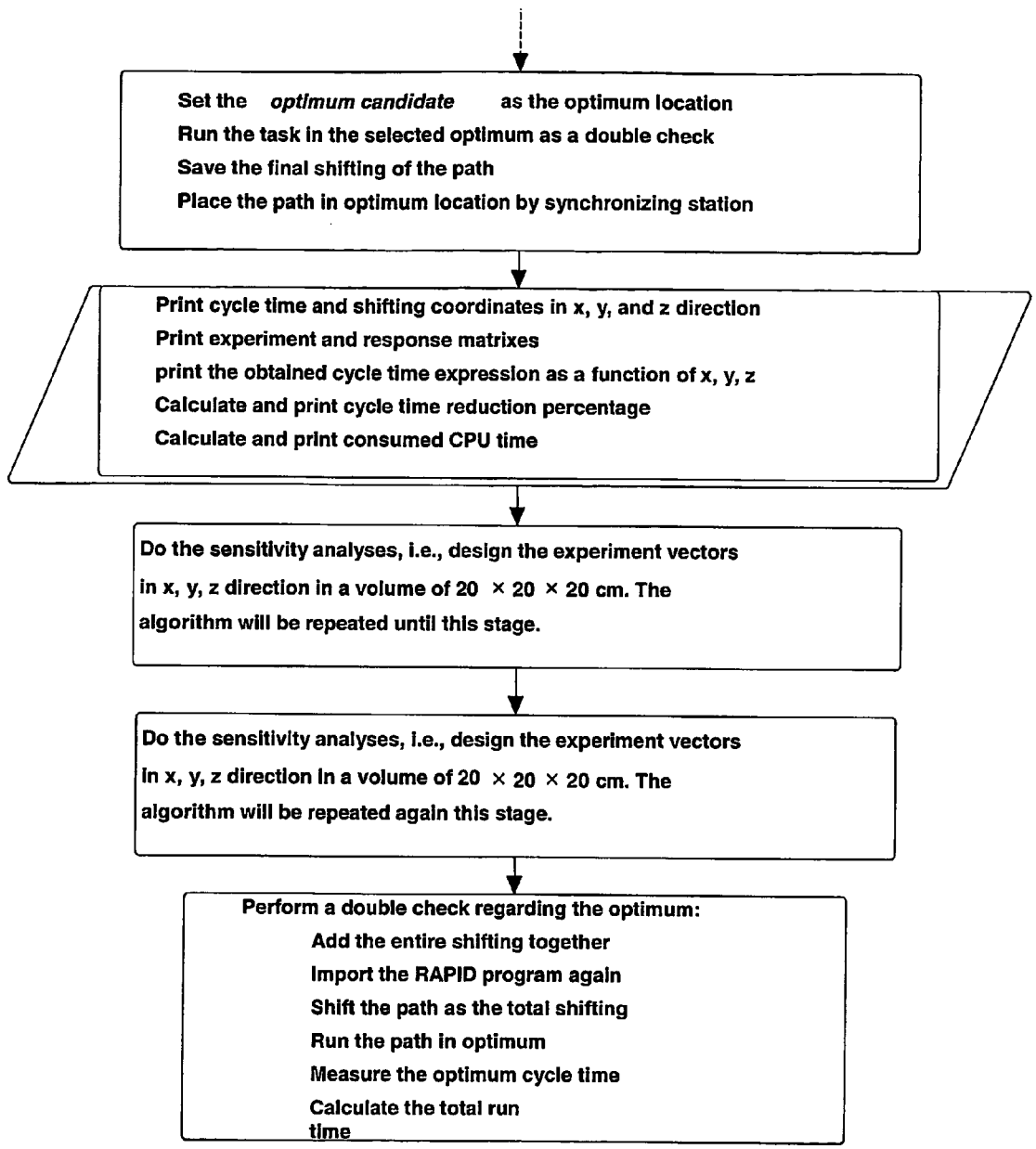
Figure 15:
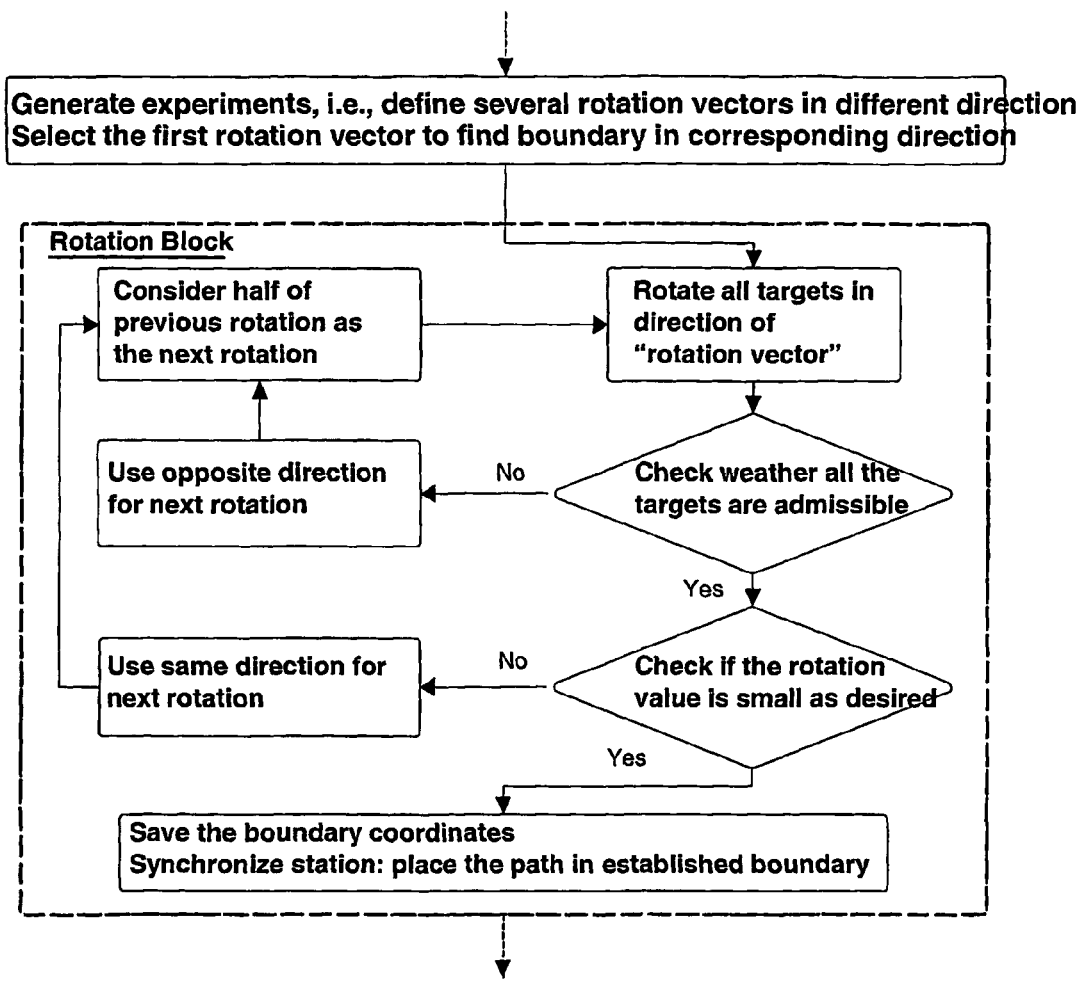
FIG. 15 is a detailed flowchart of a rotation block algorithm.

Robot tasks are defined by help of targets. A target can be considered as an infinitely small object having three coordinates defining its position and three angles defining its orientation (if Euler angle definition applies) in a three dimensional Cartesian space. As illustrated in FIG. 9, a number of different coordinate systems can be defined in which targets can be located/defined. Changing location of a task is the same thing as changing the location of all targets that are used to define that task. The position and orientation of a set of targets relative to the position and orientation of a robot can be changed in a number of ways, e.g.:

by changing the position and orientation of the set of targets by changing the position and orientation of the robot by changing the position and orientation of one of the coordinate system that the targets are defined in, by changing the position and orientation of one of the coordinate system that the robot is defined in.

Depending on which coordinate system that is used to define the cell, and how the cell is defined, one or more of the above approaches to change the position and orientation of the set of targets (i.e. the task) relative to the robot will work.

Robot tasks are considered achievable when the following conditions are fulfilled:

1) TCP of the robot may "reach" all targets (position and orientation), and

2) TCP of the robot may accomplish the movement defined between targets.

Typical motions of TCP of a robot between two adjacent targets are of two types. The first is movement along a predefined line (curved or straight). The second is by joint movement. By help of targets, movement types between targets, and desired speed for the TCP movement between targets, tasks that a robot may perform can be completely defined.

A file containing definition of targets, the TCP movement among targets, and the desired speed between adjacent targets is normally referred to as a robot program.

To determine whether a robot can perform tasks defined in a robot program requires that the robot TCP can "reach" all targets defined in the program. This is a necessary condition. Another, sufficient, condition is that the TCP movement among targets, defined in the program, must be completed.

Two criteria are used to examine whether a robot may perform tasks defined in a robot program.

The first criteria is the "Possible task placement criterion" and this criterion uses the necessary condition discussed above. A location of a task is considered as a possible placement if all the targets defined in the robot program can be reached by robots TCP. This is checked by calculating the joint angles with the kinematic model of the robot. If a solution exists and the joint angles are inside the allowable range of joint angles then the target can be reached. It is usually possible to attain the same position and orientation in several different ways, using different sets of axis angles. We call these different robot configurations. It is possible to add a demand on the robot configuration to the "Possible task placement criterion", e.g. when the path is shifted from the original location we could demand that the robot configuration should not change.

Although a possible task location does not guarantee that tasks defined in the robot program is admissible, there is a high probability that a possible task location is an admissible one. An advantage with the possible task placement criterion is that it is time efficient to evaluate.

The second criterion is the "Admissible task placement criterion" and this criterion uses the sufficient condition discussed above. Placement of the task is considered kinematically admissible if the robots TCP is able to reach all the targets defined in the robot program and also perform the movement between all consecutive targets. This basically means that it is necessary to assure that there are no kinematic singularities along the path that the robot will follow between two targets.

Investigating a sufficient number of points along the path using the kinematic model can do this. This criterion may e.g.

be evaluated by executing a robot program in a virtual controller (i.e. simulated robot control system). Since a much larger number of points need to be investigated it is obvious that this criterion is much more time consuming than the possible task placement criterion.

The above definitions are of critical importance when concerning optimal task positioning, in particular when finding boundaries for a tasks location/placement in a robots workspace.

Figure 3:
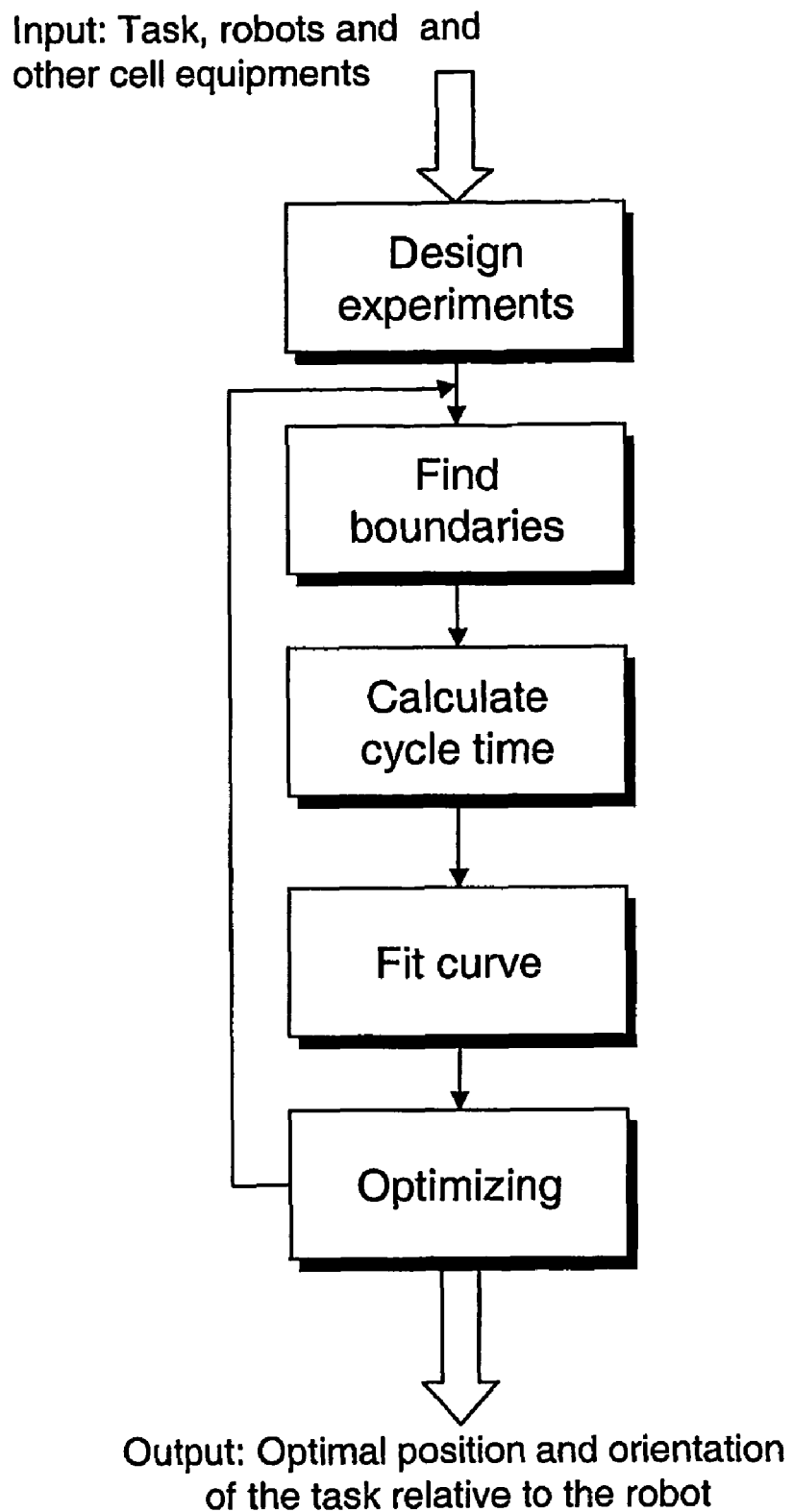
FIG. 3 is a flow chart illustrating an overview of the method according to the present invention.

In FIG. 3 a flow-chart of the preferred embodiment of the invention is illustrated. In this embodiment the location, i.e. the position and/or the orientation of a task relative to an industrial robot, is optimised with respect to cycle-time. The preferred embodiment of the invention consists of the following steps:

1) To design an experiment consisting a set of tests for task location tests
2) To find a boundary with help of the set of task location tests, within which the "admissible task location criterion" is fulfilled
3) To calculate cycle time at each admissible task location
4) To fit the task location test results (cycle time as function of the admissible task locations) to a polynomial function (or some other appropriate function)
5) To find optimal task location using the fitted polynomial
6) Steps 2) to 5) may be repeated at the determined optimal task location with a smaller dimension of the test cube (refer to FIG. 4) for an increased accuracy.

The outlined steps will be detailed in following paragraphs.

In other embodiments the optimal location of a task relative to an industrial robot could mean that the robot components lifetime is maximized, or that the lifetime of a robots components is most balanced, or power consumption of the robot system is minimized, or temperature in robots drive-train components (gearboxes, motors, and drives) is optimised or any combination of above results are achieved. A process model could also be used to optimise the quality of a robot based process. A process model is then used, together with e.g. a virtual controller, to calculate the effect on optimality. Let us use a paint application as an example to illustrate the idea.

Process model (simplified): dt=f(dv, x1, x2, ... xn), where dt=variation in paint thickness, dv=variation in TCP speed of the robot (which is a function of the location of the task), x1 ... xn other process parameters that are not influenced by the robot.

Using the above methodology and the process model, the optimal location of the task with respect to variation in paint thickness can be found.

In this embodiment there is one robot and one task but it could as well be several robots and/or several tasks involved. Furthermore it should be noted that both position and orientation do not need to be optimised, it can be only position or only orientation or only individual components of the position and/or orientation.

According to the present invention a first step of the method is that an experiment is designed, i.e. a number of tests are defined. In each test the position and/or orientation of the task is changed. These tests will later be used to find an approximation of the relationship between cycle-time and the position and orientation of the task relative to the robot. The experiment should therefore be carefully designed. If an experiment, consisting of a large number of tests, is designed a good approximation can be found. However, calculating the cycle-time for each test in the experiment is time-consuming and a large number of tests will increase the CPU time needed. An experiment that gives a satisfactory combination of accuracy and CPU-time should be chosen. A so-called full factorial design includes 27 tests.

Figure 1:
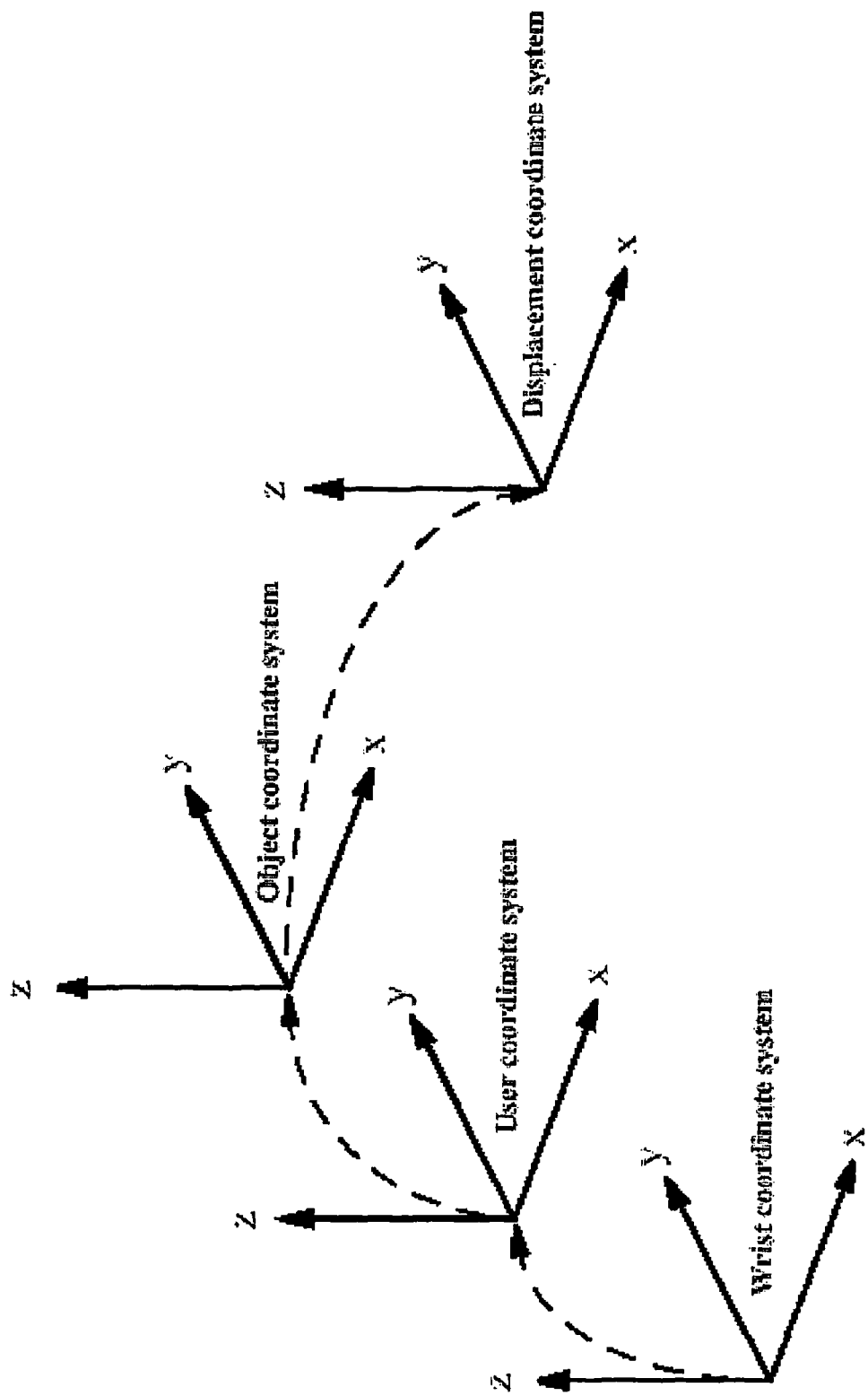
FIG. 1 illustrates different possible coordinate systems.
Figure 2:
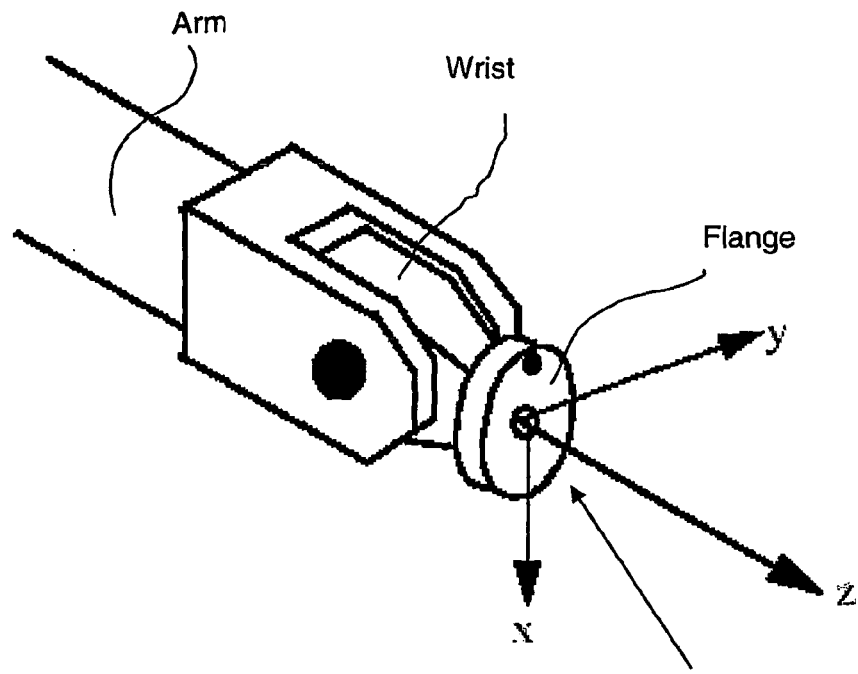
FIG. 2 illustrates coordinate system at the outer part of a robot arm.
Figure 4:
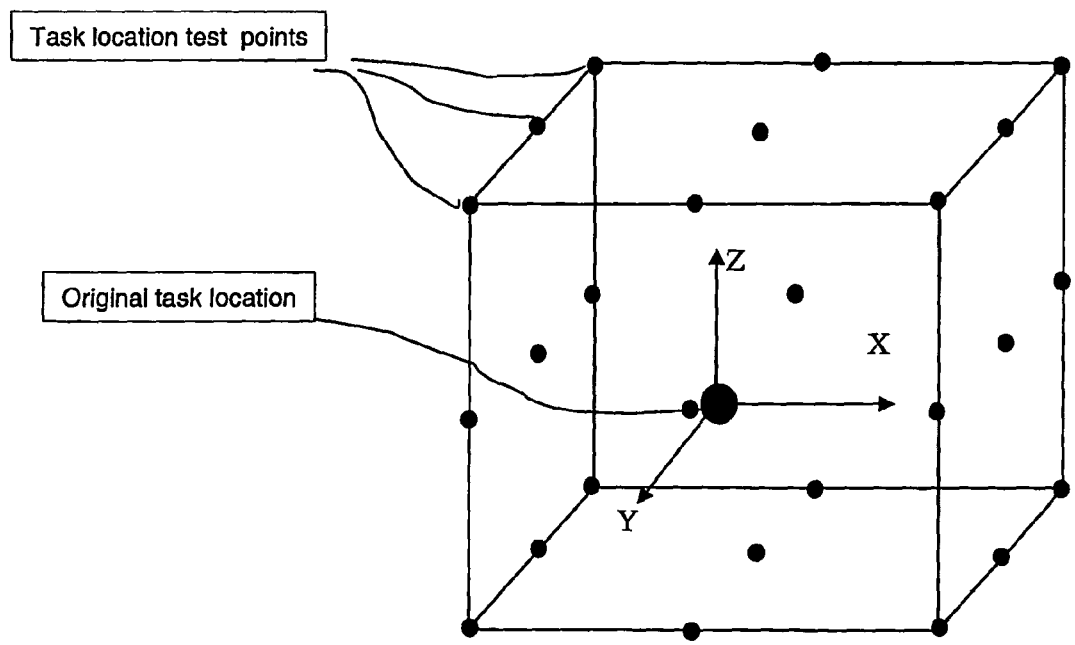
FIG. 4 shows the location test cube illustrating a full factorial experiment with 27 tests and associated task shifting vectors.

In FIG. 5 an example of a full-factorial design for a case with three variables, only position of the task, is shown. A graphical illustration of a full-factorial design for a case with three variables (only position of the task) is shown in FIG. 4. In FIG. 4 the original location of the task is shown with a big black circle or dot in the middle of the cube, while small circles or dots represent the different tests. An example of an experiment that requires less number of tests is Box-Behnken design consisting of twelve tests.

Other types of experimental designs can also be used, e.g. "central composite design", "face-centered composite design" and "Plackett-Burman design". It is also possible to use experimental designs that are adaptive, e.g. a design where more test points are used close to kinematic singularities.

Figure 6:
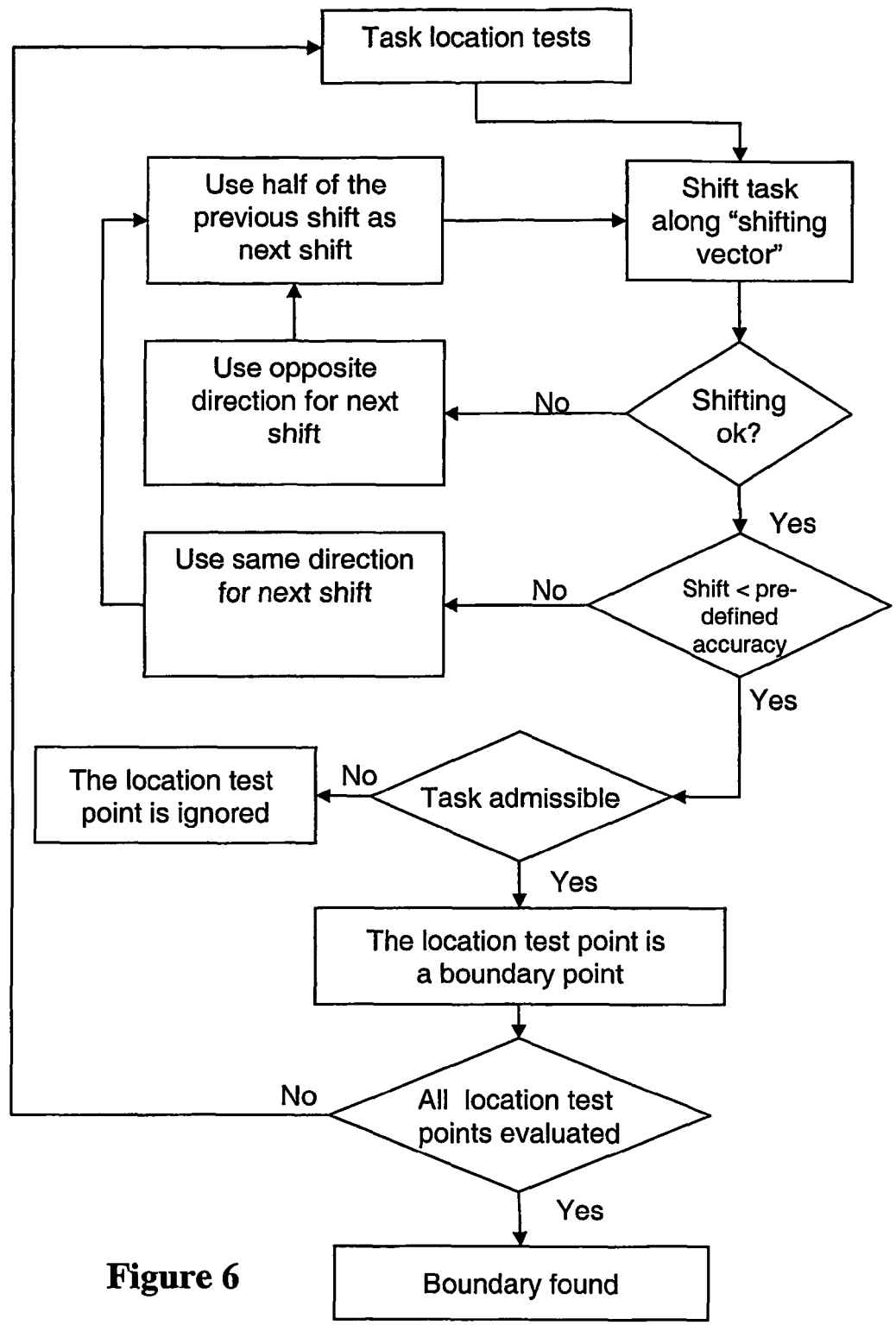
FIG. 6 is a more detailed flow chart of the method step "Finding Boundaries" in FIG. 3.

The second step of the method, to find boundary for admissible task locations illustrated in FIG. 3, is detailed here with help of the flow-chart of an algorithm shown in FIG. 6.

The algorithm consists of the following steps:
1) To shift the task location to one of the location test point illustrated in FIG. 4.
2) To check whether all targets used to define the task are possible targets using the "possible task placement criterion"
3) If condition of the step 2) is fulfilled, go to step 8)
4) If condition of the step 2) is NOT fulfilled, use the opposite shift direction of the "shifting vector" (A shifting vector is defined as a vector pointing from the original task location to the location test point)
5) Use half of the previous shift as the present shift value
6) Perform step 2)
7) If condition of the step 2) is fulfilled, go to step 8)
8) Is the shift value larger than a pre-defined accuracy measure
9) If condition in step 8) is not fulfilled, use the same shifting direction, go to step 5) and then perform step 2)
10) If condition in step 8) is fulfilled, use "Admissible task placement criterion" to check whether the task can be performed at the location test point
11) If condition in step 10) is fulfilled, this location test point will be included as a point constituting the boundary
12) If condition in step 10) is NOT fulfilled, this location test point will be ignored
13) Is all location tests examined?
14) If condition in step 13) is NOT fulfilled, go to step 1) and shift the task to a new location test point
15) If condition in step 13) is fulfilled, the algorithm is completed and the boundary found.

The directions in which the boundaries are determined preferably coincide with the directions of the experiment but the boundaries can be found in other ways (e.g. by varying one parameter at a time).

Input to the algorithm is the variables considered and in which direction the boundary should be found. In the first step the variables are shifted from their original values, next the effect of the shift is evaluated with the "Possible task placement criterion". Two criteria are used to determine if the shift is ok: 1) Possible task placement criterion, 2) A tolerance which states how close to the boundary the experiment should be conducted. If either criterion is not fulfilled a new shift value is calculated.

Figure 7:
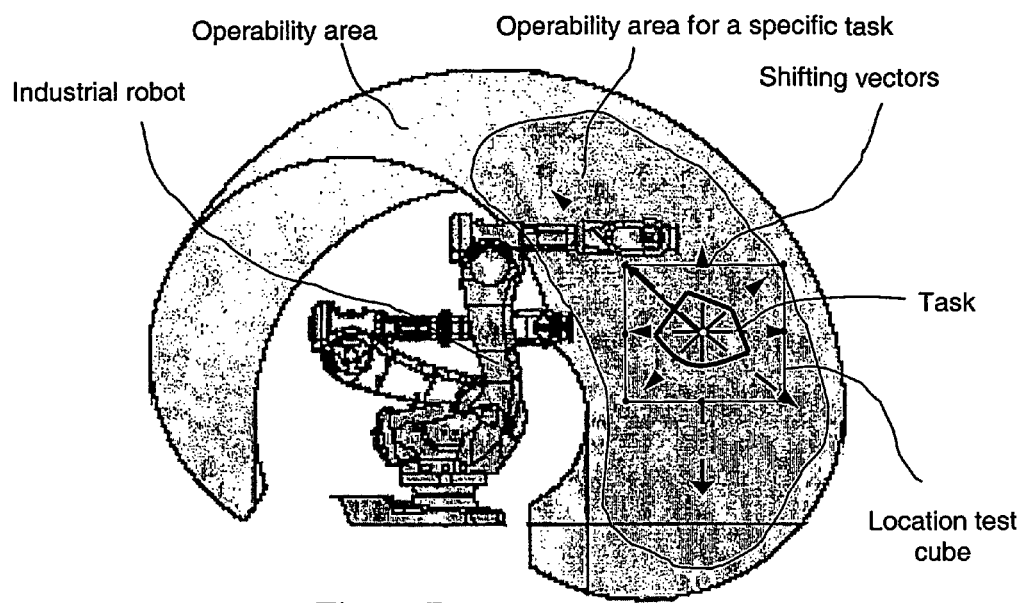
FIG. 7 illustrates the operability area/space for a specific task. Further it illustrates how the experimental directions can be used to find the operability area/space.

The experimental directions (2D case, only position) are illustrated in FIG. 7. The figure illustrates an industrial robot in two different working positions. The robots workspace consists of different areas, the overall "operability area" and the "operability area for a specific task". Inside the "operability area for a specific task" is illustrated a black box. The small black circles or dots on the black box represent experimental points (tests) for a specific task. The arrows illustrate experimental directions.

The original location of the path is shifted in the experimental directions, one at a time, by some initial amount. All targets should be inside the robots workspace after the initial shifting. The possible task placement criterion is used to check if the position and orientation of the task is ok after shifting.

The possible task placement criterion is evaluated by calculating the joint angles with the kinematic model of the robot. If a solution exists and the joint angles are inside the allowable range of joint angles then the criterion is fulfilled. If the position and orientation are not allowable, then the next shift is done in the opposite direction by an amount of $\alpha$*last shift, where $0<\alpha<1$.

If the position and orientation of the task are ok but the last shift is larger than a tolerance that specifies how close to the boundary to make the test, then the next shift is done in the same direction by an amount of $\alpha$*last shift.

If the position and orientation of the task are ok and the last shift is smaller than a tolerance that specifies how close to the boundary it is desired to perform the experiment, then the boundary is found.

The operability area, i.e. how much the task can be displaced for a specific path is illustrated in FIG. 7. It should be noted that additional criteria can be added to the possible task placement criterion, some examples are:

Some parts of the robot cell can be defined as occupied, i.e. the task can not be performed in these parts. This might be due to risk of collision, or safety reasons, or any other reasons that the cell designer may have.

Collision with other robots, or any other device in the cell can be checked.

After finding the boundaries in each direction, a simulation of path will be performed to calculate the cycle-times for each of the tests in the experiment. The task is simulated with a virtual controller, that is a simulated robot control system that gives accurate cycle-time simulations, and the time is measured during the simulation. Since the virtual controller is a simulated control system it is possible to access a major part of the information that exist in a real controller.

Hence it is possible to use a virtual controller to estimate other aspects of optimality of the position and orientation of the task. In addition to calculating the cycle time, it is also automatically checked if the robot can perform the motion between the targets, i.e., checking the task admissibility. If robot is not able to perform the task, then the corresponding test is removed from the experiment.

It would also be possible to check the "task admissibility" with the kinematic model by assuring that there are no kinematic singularities along the path. The task admissibility could then be checked before the cycle-time is calculated. This might be beneficial for cases where it takes a long time to calculate the cycle-time.

In the following step the experimental data, position, orientation, and calculated cycle-time for each test, is fitted to e.g. a polynomial function. This is exemplified below for a case with a polynomial of degree two and where only the position is varied.

Polynomial of higher degree and/or a case where only rotation is considered, or a case where position and rotation is considered, or a case where at least one component of the position and/or orientation is considered can be handled in a similar way. The cycle-time (f(x,y,z)) is then approximated with the following function:

$$f(x, y, z) = \begin{array}{l} b_0 + b_1 x + b_2 y + b_3 z + \quad \text{(linear terms)} \\ b_4 xy + b_5 yz + b_6 xz + \quad \text{(interaction terms)} \\ b_7 x^2 + b_8 y^2 + b_9 z^2 \quad \text{(quadratic terms)} \end{array} \quad (1)$$

Fitting this function to the experimental data consist of finding the coefficients b0 to b9 that results in the smallest error in the least squares sense. To do this, first the equation (1) is transformed by the following mapping so that in can be presented in linear form.

$x=x_1, xy=x_4, x^2=x_7$ $y=x_2, xz=x_5, y^2=x_8$ $z=x_3, yz=x_6, z^2=x_9$ (2)

Using equation (2) equation (1) can be expressed in matrix notation as $Y=XB+e,$ (3)

where
Y is a vector of cycle times,
X is the design matrix,
B={b0, b1, b2, . . . b9}, and
e is the vector of errors.

The design matrix is the experiment described in matrix form. B can be estimated by using the least squares method, minimizing of $L=e^T e$, as $B=(X^T X)^{-1} X^T Y$ (4)

Instead of polynomials, spline functions or Fourier series could be used.

The last step of the method, according to the invention, is now to find the position and orientation of the task that result in minimum cycle-time using the approximate expression for cycle-time. Finding the extreme point of a polynomial function is straight-forward. A necessary condition for an (interior) extreme point is that all partial derivates are zero, i.e. the point is a stationary point.

Assume that we have a function f(x1, x2, . . . xn) that is differentiable and that we want to find the extreme points of that function. Further assume that f(P), where P={a1, a2, . . . . an} is a stationary point. Define a matrix A=(aij), where $$a_{ij} = \frac{\partial^2}{\partial x_i \partial x_j} f(P).$$

Then P is a local minimum (maximum) point if Q={x1, x2, . . . . xn}tA{x1, x2, . . . . xn} is positive (negative) definite.

In addition to finding the interior extreme points the boundary needs to be investigated.

Even if the operability area for a specific task has been determined in the preceding steps it might be advantageous to add some constraints to the optimization. As an example one might want to exclude certain parts of the operability area due to safety reasons or due to risk for collision with other objects. Excluding a cylinder with radius R that with the center located at (x1,y1) can be expressed by the following constraint:

$(x-x1)2+(y-y1)2>R2.$

Depending on how complicated constraints are introduced, different kinds of optimization methods can be used, e.g. complex method, SQP-methods, gradient method.

The minimum of the approximate cycle time function does not necessarily provide the actual minimum cycle time. Moreover, although the optimum is found inside boundaries, it can not be guaranteed that the optimum location fulfills the admissible task placement criterion. Due to these reasons, the minimum of the cycle time function can only be considered as a candidate for optimality or optimum candidate. In other words, the optimum location predicted by the function must be tested by running the path simulation.

Figure 8:
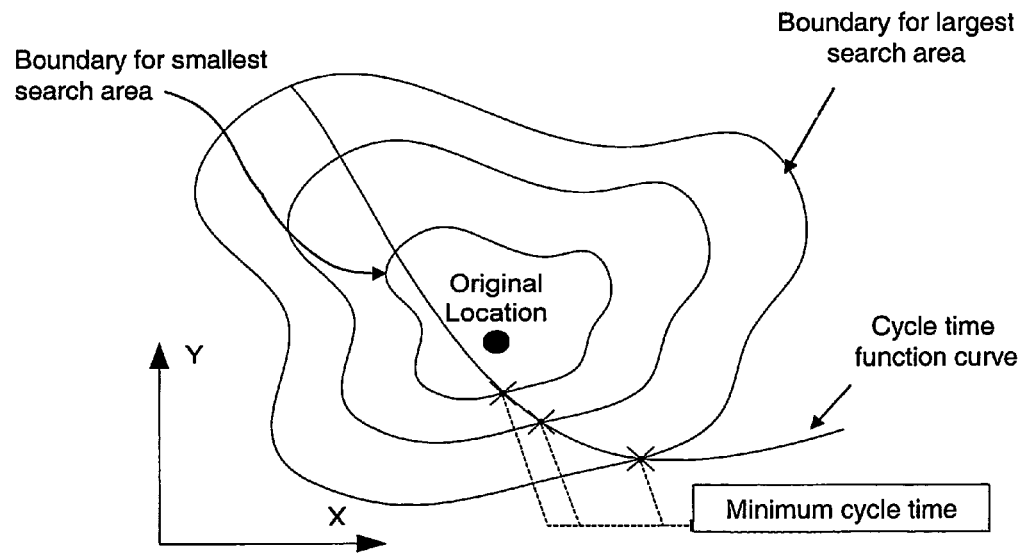
FIG. 8 is a 2D-illustration of that searching of the minimum of response function in different areas may give different results.

If the path is successfully simulated, then cycle time will be measured. Otherwise, the closest possible task location in the direction of optimum vector is selected as an optimum candidate. This procedure can be called sequential backward shifting. Due to the probability of finding an inadmissible location as an optimum candidate, the algorithm can determine several optimum candidates within different search areas. Different search areas around the original path location are considered to find several optimal candidates. This concept is illustrated in FIG. 8. In FIG. 8 three different search areas around the original location are used, and an optimal (minimum in this case) point is found for each search area.

As can be seen in the 2D schematic drawing of FIG. 8, by assuming smaller search areas different optimum candidates are resulted. Taking this measure has the advantage of introducing several optimum candidates with different distance from the original location. All candidate points are examined and cycle time will be measured. If a task can not be run in one of the candidate location, i.e., if that location is an inadmissible location, then that location is removed from the list of optimum candidate. After examining all the candidates, the minimum of actual tests is selected as the real optimum. With the above procedure the optimum point is found, nevertheless, it is still necessary to consider some other probable cases.

The first case that should be taken into account is the case when none of the optimum candidates is admissible. The optimum candidates are not admissible and even during the sequential backward shifting to the original location a possible location can not be found or in case a possible solution exists, the robot reaches to joint limits somewhere on the path between the targets. The shortest cycle time of experiments is then selected as an optimum.

Note that the admissibility of experiment location has been previously checked by running the path simulation. Even if the optimum location is admissible, it is still reasonable to check if the optimised cycle time is less than all the experiment cycle times. If cycle time of an experiment is less than the cycle time in optimum location, then that location will be considered as the optimum.

After an optimal position and rotation of the task has been found the above described steps can be repeated, but this time an experiment is designed in a small area around the optimal point (position and orientation). By repeating the steps in a smaller area the accuracy of the optimal point is usually improved and hence the cycle-time (or some other measure of optimality) is reduced.

For some cases it can be advantageous to use a polynomial of low order (an experiment consisting of fewer tests can be used) to find a first approximation and then as a second step a higher order polynomial can be used in a smaller area around the first approximation. The process of designing new experiments around the optimal point predicted by a previous experiment can be repeated several times.

The methodology described here for optimal robot positioning can be exploited to realize other optimization objectives such as maximizing component lifetime, minimizing energy consumption, and optimizing thermal management of the robot system, optimizing the quality of robot based processes.

For using the method according to the invention there is no limitation to a specific robot type, meaning that any kind of robot can be considered and used. The task is also general and any kind of tasks can be considered or used.

A method according to the invention may also, at least partly, be performed under control of a set of computer readable instructions or code means contained in a computer program storage device for making a computer or processor perform any of the steps of the above described method.

The invention may also use a computer readable product for carrying out the method according to the invention.

While the present invention has been described in terms of the preferred embodiments, the invention is not limited thereto, but can be embodied in various ways without departing from the principle of the invention as defined in the appended claims.

The invention claimed is:

1. A method for optimizing the location of a task to be performed relative to a robot, the method comprising:
   defining a number of tests to be simulated;
   defining the plurality of tests, the tests differing from each other regarding a location of the task in relation to the robot;
   determining boundaries for the location of the task to be performed, wherein the robot can perform the task within the boundaries;
   adjusting the locations of the task in the tests so that the locations are inside the boundaries;
   performing simulations, on a processor, of the defined tests with regarding to one aspect of optimality;
   determining a mathematical function describing a relationship between the one aspect of optimality and the location of the task to be performed relative the robot based on a result of the simulations and the locations of the task in each of the respective tests;
   calculating an extreme point of the determined mathematical function; and
   calculating an optimal location of the task to be performed relative to the robot based on the calculated extreme point of the determined mathematical function.

2. The method according to claim 1, wherein optimizing the performance of the task comprises optimizing at least one of position and orientation of the task.

3. The method according to claim 1, wherein said mathematical function comprises a polynomial function.

4. The method according to claim 1, wherein said mathematical function comprises a spline function.

5. The method according to claim 1, wherein said mathematical function comprises a Fourier series function.

6. The method according to claim 1, wherein the effect on optimality is calculated by performing a simulation of the path at the location of the task in the tests.

7. The method according to claim 5, wherein the simulation is performed using a virtual controller.

8. The method according to claim 1, wherein the effect on optimality is determined by running the task on at least one robot.

9. The method according to claim 1, wherein the effect on optimality is calculated using a process model.

10. The method according to claim 1, further comprising:
    increasing an accuracy of the optimal position of the task by repeating in a smaller area around the optimal position at least one of defining a plurality of tests, determining boundaries for the location of the task, adjusting the locations of the task in the tests so that the locations are inside the boundaries, determining effects on optimality for the locations of the task in the tests, fitting the determined effects on optimality to a mathematical function, calculating an extreme point of the function, and calculating an optimal location of the task.

11. The method according to claim 1, further comprising: optimizing at least one of the position and orientation of the task relative to several robots.

12. The method according to claim 11, further comprising: determining a region of operability of a specific robot performing a specific task using a three-dimensional bisection algorithm.

13. The method according to claim 1, further comprising:
calculating cycle time by performing the task when the task is located on the boundaries of an operability region of the robot.

14. A system for optimizing the location of a task to be performed relative to a robot, the system comprising a processor configured to:
determine boundaries for the location of the task to be performed, wherein the robot can perform the task within the boundaries;
adjust the location of a defined task in a predefined number of tests so that the locations are inside the boundaries, wherein the tests differ from each other regarding a location of the task in relation to the robot;
perform simulations of the defined tests with regarding to one aspect of optimality;
determine a mathematical function describing a relationship between the one aspect of optimality and the location of the task to be performed relative the robot based on a result of the simulations and the locations of the task in each of the respective tests;
calculate an extreme point of the determined mathematical function; and
calculate an optimal location of the task to be performed relative to the robot based on the calculated extreme point of the mathematical function.

15. The system according to claim 14, wherein optimizing the performance of the task comprises optimizing at least one of position and orientation of the task.

16. A computer program product, comprising:
a computer readable medium; and
computer program code instructions recorded on the computer readable medium and executable by a processor for carrying out a method for optimizing performance of a task relative to a robot, the method comprising:
defining a predefined number of tests, the tests differing from each other regarding a location of the task in relation to the robot;
determining boundaries for the location of the task to be performed, wherein the robot can perform the task within the boundaries;
adjusting the locations of the task in the tests so that the locations are inside the boundaries;
performing simulations of the defined tests with regarding to one aspect of optimality;
determining a mathematical function describing a relationship between the one aspect of optimality and the location of the task to be performed relative the robot based on a result of the simulations and the locations of the task in each of the respective tests;
calculating an extreme point of the determined mathematical function; and
calculating an optimal location of the task to be performed relative to the robot based on the calculated extreme point of the determined mathematical function.

17. A method in accordance with claim 1, wherein the mathematical function is determined by fitting the location of the task in each test and the corresponding result of the simulation of each task to a defined mathematical function.

18. A system in accordance with claim 14, wherein the mathematical function is determined by fitting the location of the task in each test and the corresponding result of the simulation of each task to a defined mathematical function.

19. A computer program product in accordance with claim 16, wherein the mathematical function is determined by fitting the location of the task in each test and the corresponding result of the simulation of each task to a defined mathematical function.

* * * * *